US012447636B2

(12) United States Patent
Winters

(10) Patent No.: US 12,447,636 B2
(45) Date of Patent: Oct. 21, 2025

(54) BLADE LOCK MECHANISM

(71) Applicant: Bryan Winters, Lakeville, MN (US)

(72) Inventor: Bryan Winters, Lakeville, MN (US)

( * ) Notice: Subject to any disclaimer, the term of this patent is extended or adjusted under 35 U.S.C. 154(b) by 204 days.

(21) Appl. No.: 18/450,113

(22) Filed: Aug. 15, 2023

(65) Prior Publication Data

US 2025/0058483 A1 Feb. 20, 2025

(51) Int. Cl.
*B26B 1/04* (2006.01)

(52) U.S. Cl.
CPC .................................... *B26B 1/048* (2013.01)

(58) Field of Classification Search
CPC .... B26B 1/00; B26B 1/02; B26B 1/04; B26B 1/048
See application file for complete search history.

(56) References Cited

U.S. PATENT DOCUMENTS 8,001,693 B2 * 8/2011 Onion ........................ B26B 1/02 30/155
9,138,903 B2 * 9/2015 Vellekamp ................ B26B 1/02
9,327,413 B2 * 5/2016 Sakai ....................... B26B 1/042
9,815,213 B2 * 11/2017 Duey ....................... B26B 1/048
9,943,970 B2 * 4/2018 Glesser ................... B26B 1/048
10,695,920 B2 * 6/2020 Bruhns .................... B26B 1/044
10,759,067 B2 * 9/2020 Huang ..................... B26B 1/044
10,870,209 B2 * 12/2020 Demko .................... B26B 1/048
11,673,280 B1 * 6/2023 Randall ...................... B26B 1/04 30/161
11,820,028 B2 * 11/2023 Makari .................... B26B 1/044
12,172,330 B2 * 12/2024 Wu ........................... B26B 1/048
2009/0144986 A1 * 6/2009 Frazer ...................... B26B 1/042 30/155
2010/0236078 A1 * 9/2010 Duey ....................... B26B 1/048 30/159
2011/0010947 A1 * 1/2011 Freeman ................. B26B 1/048 30/159
2012/0017443 A1 * 1/2012 Hao ........................... B26B 1/02 30/161
2015/0352731 A1 * 12/2015 France ..................... B26B 1/048 30/159
2020/0290221 A1 * 9/2020 Hangartner ............. B26B 1/048
2021/0197411 A1 * 7/2021 Demko ...................... B26B 9/00

OTHER PUBLICATIONS

Winterbladeco, Lock and Knife Prototype—Instagram Post, dated Aug. 16, 2022, https://www.instagram.com/p/ChT75A-AQSc/.

* cited by examiner

*Primary Examiner* — Adam J Eiseman
*Assistant Examiner* — Richard D Crosby, Jr.
(74) *Attorney, Agent, or Firm* — Hauptman Ham LLP

(57) ABSTRACT

An apparatus relating to opening/closing a knife includes an actuator including a pivot. The apparatus includes a lock frame including a first end and a second end. The first end includes a lock protruding portion and an extension portion. The second end includes a tapered portion, and the actuator is rotatably mounted via the pivot to the extension portion. The apparatus for opening/closing a knife also includes a tension member. The apparatus for opening/closing a knife also includes a lock mount portion. The lock protruding portion includes a guide post to secure the lock frame to the lock mount portion. The apparatus for opening/closing a knife also includes a bolt, and the tension member is captive between the actuator, the lock frame, and the bolt.

15 Claims, 6 Drawing Sheets

BLADE LOCK MECHANISM

BACKGROUND

Knives come in a variety of different configurations, such as a knife that is able to fold, i.e., a folding knife, in/out of a protective frame so that the knife can be carried in the pocket securely without the blade of the knife being exposed. To be able to deploy the blade of the knife, a deployment mechanism facilitates this action. Many deployment mechanisms, e.g., a flipper tab, protrude from the spine of the blade, and can make the knife difficult to carry or hold, and potentially dangerous while using the knife to perform a task, such as a task where the user chokes up on the knife and the deployment mechanism interferes with a user's grip/hold on the knife.

SUMMARY

To address the problems of such deployment mechanisms, the device disclosed herein has an actuator portion which is able to rotate into the frame of the knife when the blade is in both a undeployed/closed or deployed/opened configuration. A user of the knife is able to apply pressure on the actuator portion such that the actuator portion rotates/pivots out of the frame of the knife. In both the undeployed and deployed configurations of the knife, the actuator portion remains recessed or concealed residing in the frame of the knife. The incorporation of such a deployment mechanism into a folding knife provides for more comfortable carry and operation of a knife, such as to reduce the risk of accidental deployment. In addition to the actuator portion, the device disclosed herein also has another deployment mechanism which includes guide posts or thumb studs/pegs. The guide posts extend from the lock frame of the knife through the scales/grips/handle of the knife such that each guide post protrudes on opposing sides of the knife so that a user is able to use alternative fingers to deploy/undeploy the blade. Having multiple deployment mechanisms provides for more versatility of the knife, as well as redundancy in locking features to reduce the possibility of the knife failing while in use and causing potential injury or damage to the user.

In the present disclosure, the apparatus for opening/closing a knife includes an actuator including a pivot. The apparatus includes a lock frame including a first end and a second end. The first end includes a lock protruding portion and an extension portion. The second end includes a tapered portion, and the actuator is rotatably mounted via the pivot to the extension portion. The apparatus for opening/closing a knife also includes a tension member. The apparatus for opening/closing a knife also includes a lock mount portion. The lock protruding portion includes a guide post to secure the lock frame to the lock mount portion. The apparatus for opening/closing a knife also includes a bolt, and the tension member is captive between the actuator, the lock frame, and the bolt.

BRIEF DESCRIPTION OF DRAWINGS

The disclosure is described in more detail below on the basis of drawings. In the drawings.

The FIGURES use the same reference numerals for identical or similar components, even when there is no repeated description on grounds of simplification.

DETAILED DESCRIPTION

Figure 1A:
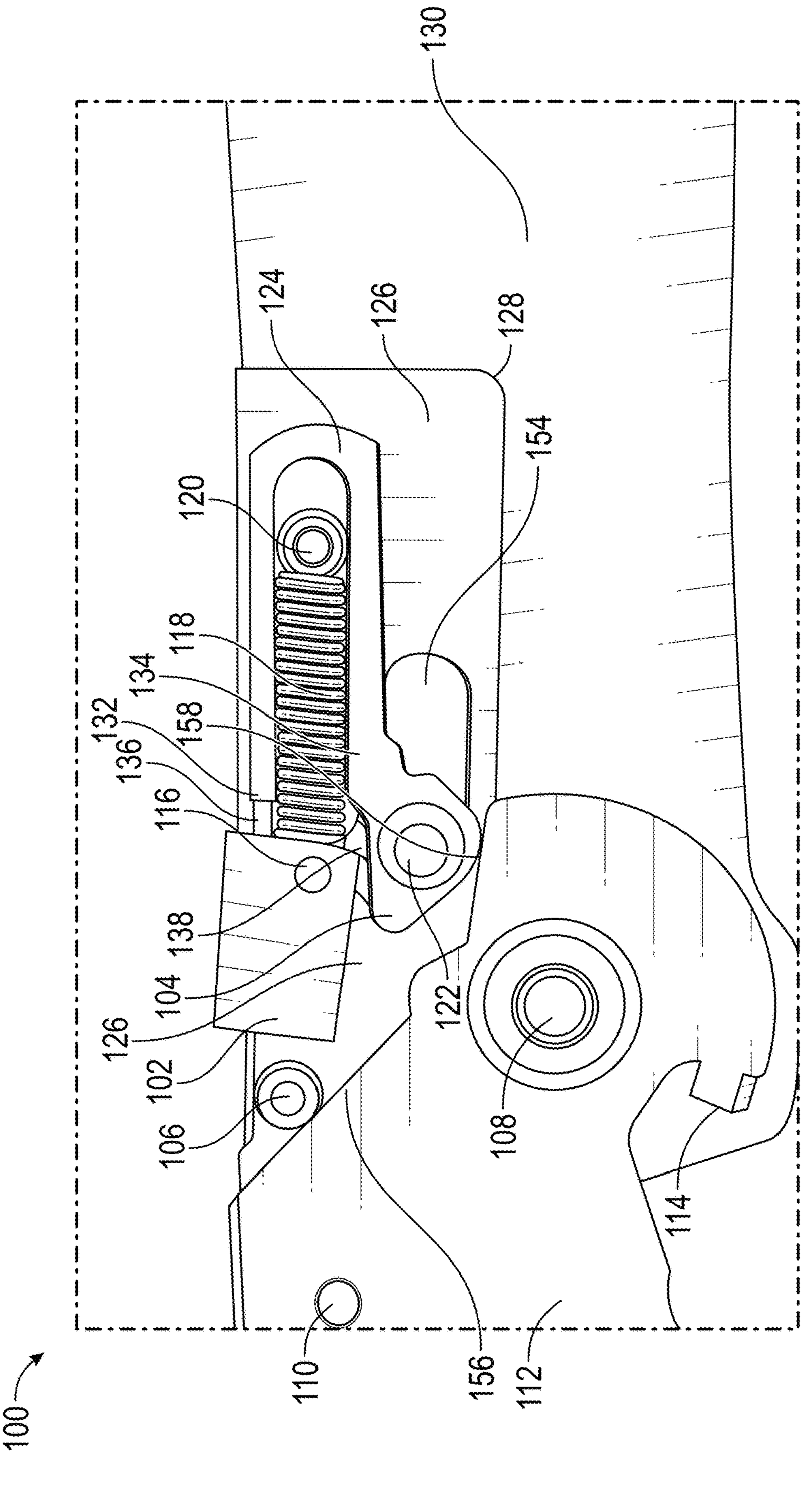
FIG. 1A is an exposed view of a knife lock mechanism in the deployed/opened configuration according to at least one embodiment of the disclosure.

In FIG. 1A is a knife lock mechanism 100 in the deployed/opened configuration according to at least one embodiment of the disclosure.

An actuator portion 102 is pivotally mounted via a pivot portion 116 to a lock mount portion 126. In addition to the lock mount portion 126, there is another lock mount portion (not numbered) similar to the lock mount portion 126 and opposes the lock mount portion 126. The lock mount portion(s) 126 are positioned parallel with respect to each other and keep a tension portion/spring 118 captive/enclosed in a lock frame 124 in an assembled state of the knife. The lock mount portion 126 has a stop pin 106 that spans between the lock mount portion(s) 126 so as to fix the lock mount portion(s) 126 when the knife is in an assembled state. In some embodiments, the stop pin 106 is fixed to one of the lock mount portion(s) 126. In some embodiments, the stop pin 106 is held in place by pressure between the lock mount portion(s) 126 when the knife is in the assembled state. In some embodiments, the stop pin 106 is a solid component. In some embodiments, the stop pin 106 is a hollow component which reduces the weight of the knife (as shown in FIG. 1A).

The lock mount portion(s) 126 are also fixed into recessed portion(s) 128, the recessed portion(s) 128 having a shape complementary to a shape of the lock mount portion(s) 126. In some embodiments, the recessed portion(s) 128 are part of a liner (not numbered) that fits/nests within the scales/grips/handle 130 in an interior portion of the knife. In some embodiments, the recessed portion(s) 128 are part of the scales/grips/handle 130, itself (as shown in FIG. 1A). The lock mount portion(s) 126 are also fixed in place via a bolt portion 120. In some embodiments, the bolt portion 120 is fixed to one of the lock mount portion(s) 126. In some embodiments, the bolt portion 120 is held in place by pressure between the lock mount portion(s) 126 when the knife is in the assembled state. In some embodiments, the bolt portion 120 is a solid component. In some embodiments, the bolt portion 120 is a hollow component which reduces the weight of the knife (as shown in FIG. 1A). The tension portion/spring 118 at a second end thereof contacts the bolt portion 120.

Force vectors (not shown) of the tension portion/spring 118 are substantially parallel to the movement of the tension portion/spring 118. Due to the force vector applied by the tension portion/spring 118 against the actuator portion 102, the actuator portion 102 is able to be at a resting (non-actuated) position with a length portion 146 (see FIG. 1B) of the actuator portion 102 being substantially parallel to the lock frame 124 (i.e., arms of the lock frame 124) and the length of lock mount portion(s) 126. The tension portion/spring 118 is under tension due to being captive between the actuator portion 102, the bolt portion 120 (see FIG. 1A, FIG. 1D, and FIG. 1E), and the (U-shaped) lock frame 124.

The lock frame 124 moves in a direction parallel to the lock mount portion(s) 126 and in a longitudinal direction of the knife. In some embodiments, a guide post 122 is fixed to a lock protruding portion 104 of the lock frame 124. In some embodiments, the guide post 122 is detachably mounted to the lock protruding portion 104. The lock protruding portion 104 and the lock frame 124 are integral components. The lock frame 124 is a substantially U-shaped component having a first end 134 from which the lock protruding portion 104 extends and a second end 132, the first end 134 being parallel to the second end 132.

Figure 1B:
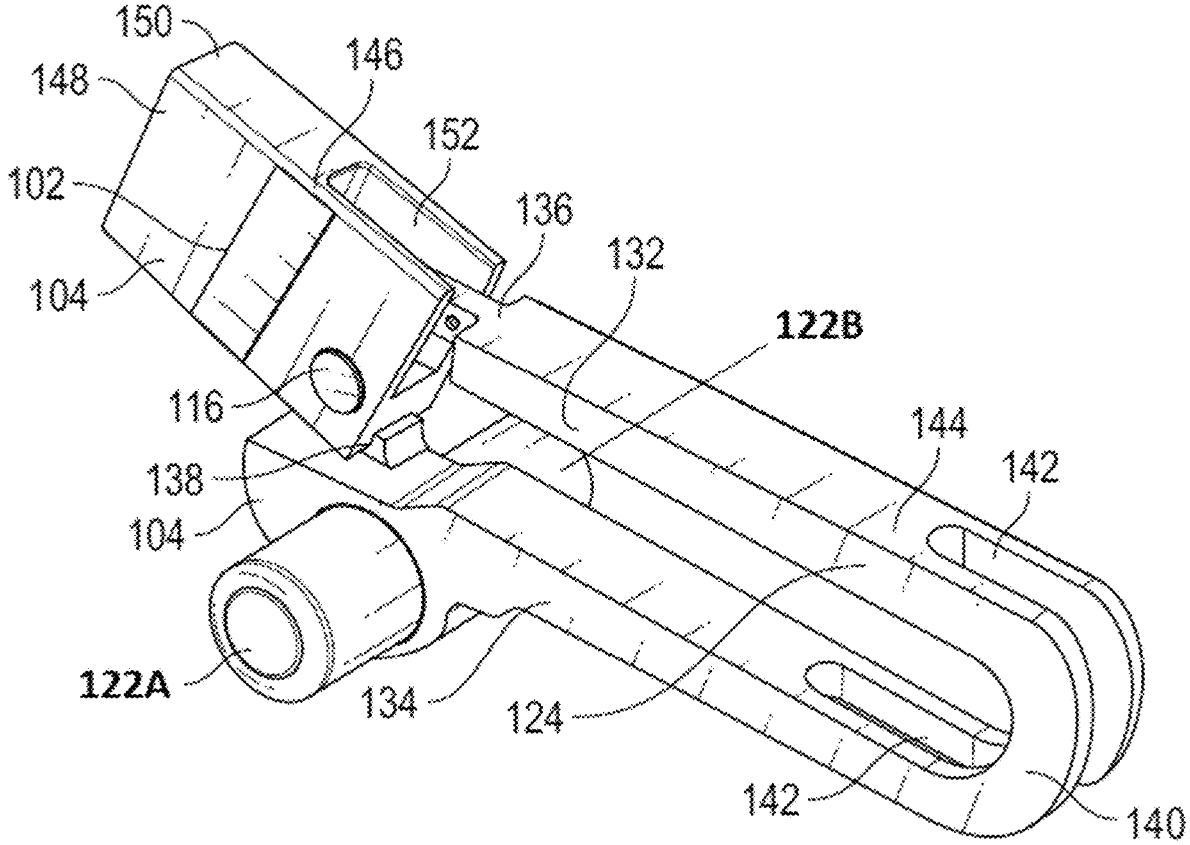
FIG. 1B is an exposed view of a knife lock mechanism according to at least one embodiment of the disclosure.

In FIG. 1B, a bent portion 140 of lock frame 124 is on a side of the lock frame 124 opposite to the first end 134 and the second end 132. Approximately on the bent portion 140 is a slot/aperture portion 142, i.e., milled/removed material, from a depth portion 144 of the lock frame 124. The slot/aperture portion 142 is configured to receive/accommodate the blade 112 as the blade 112 passes through (see FIG. 1D) the lock frame 124 as the blade 112 is deployed/opened or undeployed/closed.

The second end 132 has a tapered portion 136 that extends therefrom. The tapered portion 136 and the lock protruding portion 104 are substantially parallel with respect to each other. The lock protruding portion 104 has an extension portion 138. The extension portion 138 extends into the actuator portion 102 in a direction substantially perpendicular to the direction in which the second end 132/the tapered portion 136 extends. The actuator portion 102 is pivotally mounted via the pivot portion 116 to the extension portion 138 (see FIG. 1A and FIG. 1B). The actuator portion 102 is substantially rectangular having length portion 146, width portion 148, and depth portion 150. The pivot portion 116 is positioned at the width portion 148 near the bottom of the actuator portion 102.

The tension portion/spring 118 (see FIG. 1A) at a first end thereof contacts the depth portion 150 adjacent to the width portion 148 on the bottom of the actuator portion 102.

Figure 1C:
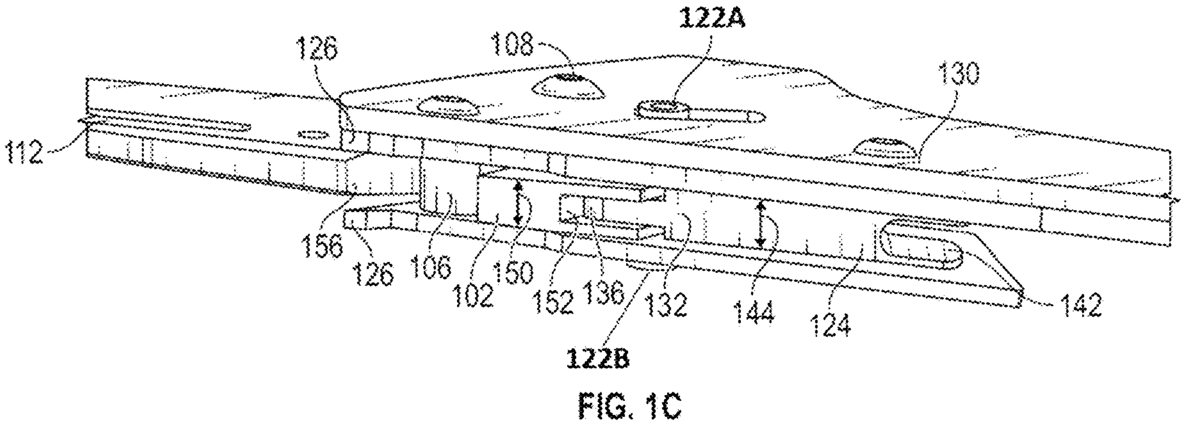
FIG. 1C is a rear view of a knife lock mechanism according to at least one embodiment of the disclosure.

As seen in FIG. 1B and FIG. 1C, along the length portion 146 of the actuator portion 102 which faces away from the blade 112, on the depth portion 150 adjacent to the length portion 146 is a slot/aperture portion 152 that is able receive/accommodate the tapered portion 136 as the actuator portion 102 is manipulated. The actuator portion 102 is able to rotate in an arc about the pivot portion 116 thereof until rotation of the actuator portion 102 is occluded by the lock protruding portion 104 and the second end 132.

In some embodiments, the guide post 122 extends from one side of the scale/grip/handle 130 to the opposing side of the scale/grip/handle on other side (not shown), hence, the guide post 122 is also able to be utilized as an actuator to open/close the blade, like actuator portion 102. The guide post 122 moves relative to the lock mount portion(s) 126 and parallel to the movement of the tension portion/spring 118 linearly along a track/groove portion 154 of the lock mount portion(s) 126. In some embodiments, the guide post 122 includes two guide post parts, 122A and 122B, each guide post protruding from the protruding portion 104 through the lock mount portion(s) 126 via the track/groove portion 154. In some embodiments, a first guide post of the two guide posts can be longer than a second guide post of the two guide posts. In addition to deploying/undeploying of the blade via the actuator portion 102, the guide post(s) 122 can be utilized to deploy/undeploy the blade.

Figure 1D:
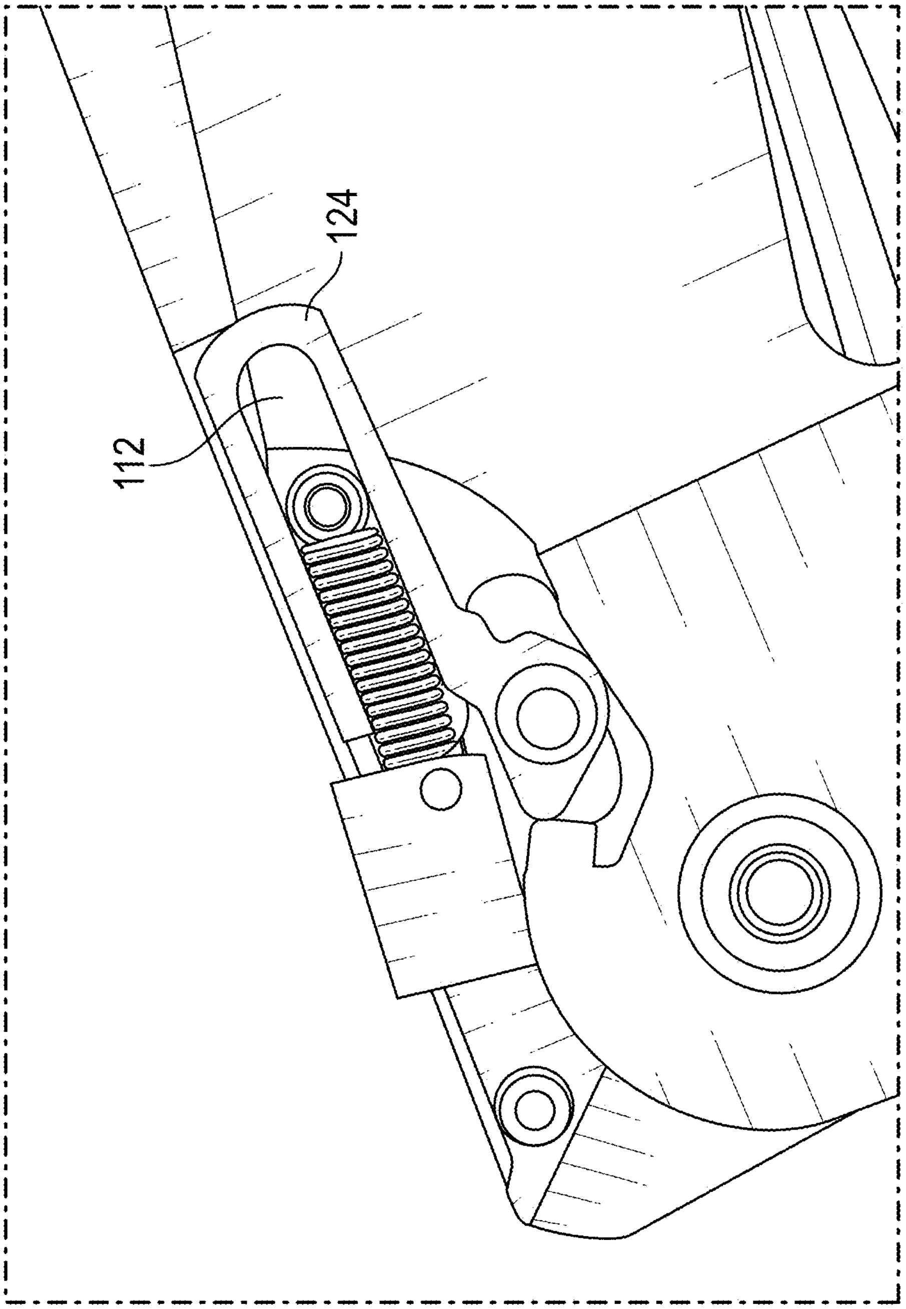
FIG. 1D is an exposed view of a knife lock mechanism in the undeployed/closed configuration according to at least one embodiment of the disclosure.
Figure 1E:
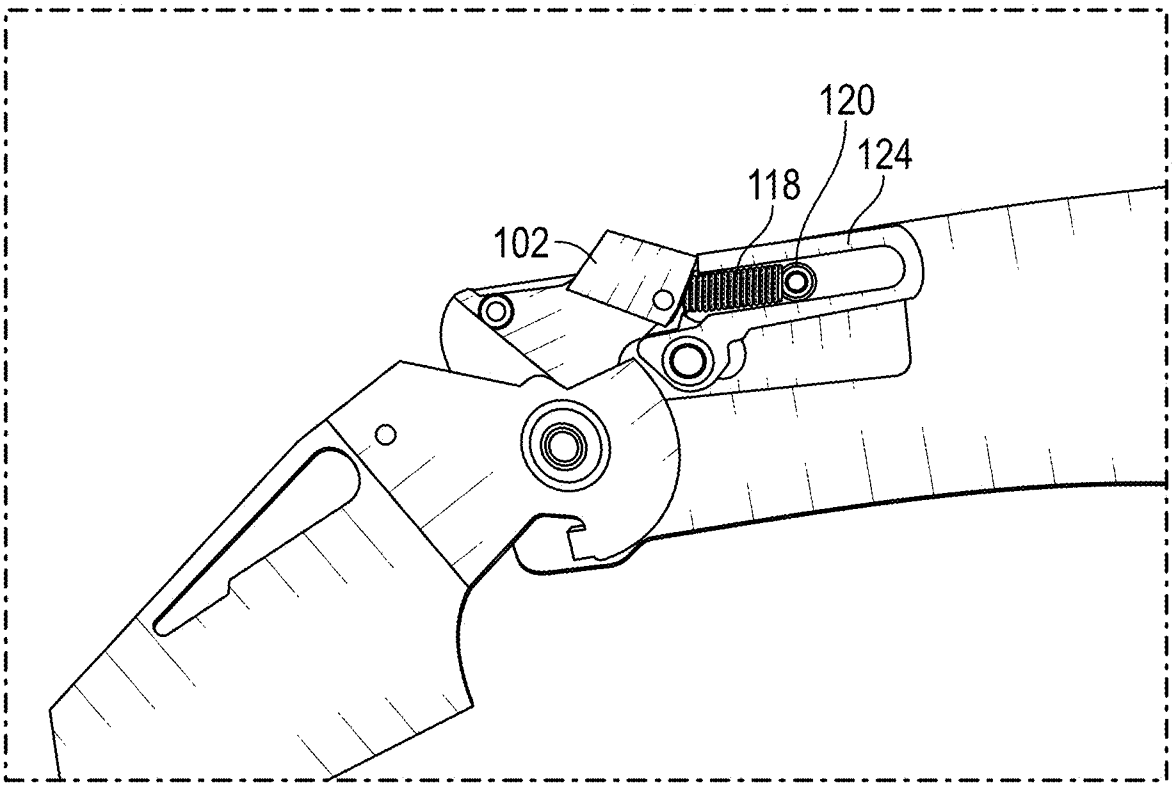
FIG. 1E is an exposed view of a knife lock mechanism with the actuator being pressed according to at least one embodiment of the disclosure.
Figure 1F:
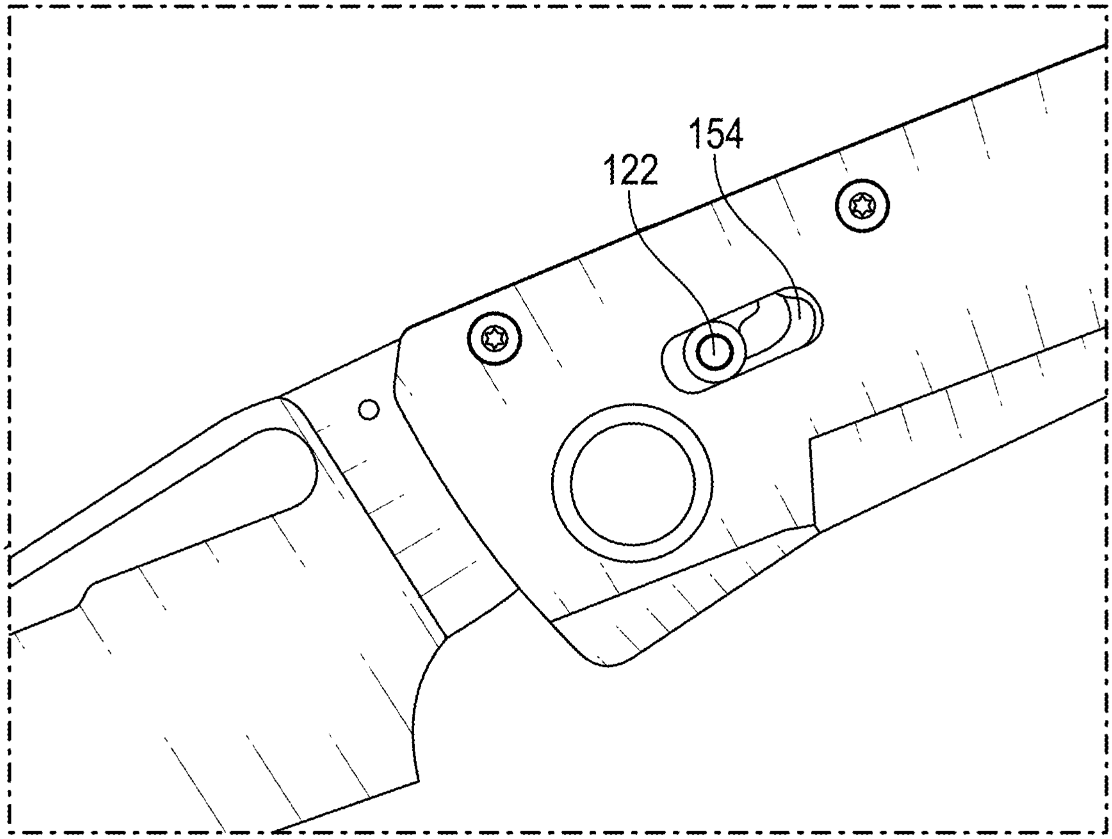
FIG. 1F is a knife lock mechanism with a guide post according to at least one embodiment of the disclosure.

In the undeployed configuration as seen in FIG. 1D, an undeployed lock face 114 (see FIG. 1A) of the blade 112 contacts the lock protruding portion 104 (see FIG. 1A) of the lock frame 124. The lock protruding portion 104 (see FIG. 1A) holds the blade 112 in the undeployed configuration under tension due to the tension portion/spring 118. In the undeployed/closed configuration, the tension of the tension portion/spring 118 is greater due to the tension portion/spring 118 being further compressed compared to the tension of the tension portion/spring 118 in the deployed/opened state. When the actuator portion 102 is manipulated in a downward direction (as seen in FIG. 1E) so as to further compress the tension portion/spring 118, the blade 112 deploys via rotating about a pivot portion 108 until contact is simultaneously made (1) between a first flat portion 156 of the blade 112 and the stop pin 106 (as seen FIG. 1A) which prevents the blade 112 from going too far back and (2) between a second flat portion 158 and the lock protruding portion 104 (as seen in FIG. 1A) which prevents the blade 112 from going forward/down and causing potential injury to the user/operator, the blade 112 then being in the deployed state.

In the present disclosure, the apparatus for opening/closing a knife includes an actuator including a pivot. The apparatus includes a lock frame including a first end and a second end. The first end includes a lock protruding portion and an extension portion. The second end includes a tapered portion, and the actuator is rotatably mounted via the pivot to the extension portion. The apparatus for opening/closing a knife also includes a tension member. The apparatus for opening/closing a knife also includes a lock mount portion. The lock protruding portion includes a guide post to secure the lock frame to the lock mount portion. The apparatus for opening/closing a knife also includes a bolt, and the tension member is captive between the actuator, the lock frame, and the bolt.

The actuator is configured to rotate between the lock protruding portion and the tapered portion or the second end. The pivot is at a portion of the actuator closest to the tension member. The actuator includes a slot/aperture portion. The first slot/aperture portion is configured to receive the tapered portion. The lock frame includes a slot/aperture portion. The apparatus for opening/closing the knife includes a blade of the knife which is configured to rotate through the second slot/aperture portion. The guide post extends through a track/groove portion of the lock mount portion to protrude through a scale/grip/handle of the knife. The guide post is configured to move in a linear direction through a track/groove portion of the lock mount portion. The guide post includes a first guide post and a second guide post. The extension portion extends in a direction orthogonal to a direction in which the lock protruding portion extends. The actuator is configured in a position which is recessed beneath a scale/grip/handle of the knife. The tension member applies a force to a bottom portion of the actuator to maintain the actuator in a position which is recessed beneath a scale/grip/handle of the knife. The lock frame is substantially parallel to a track/groove portion of the lock mount portion. The lock frame is a substantially U-shaped component.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

What is claimed is:

1. An apparatus for opening/closing a knife, the apparatus comprising:

an actuator including a pivot;

a lock frame including a first end and a second end, the first end including a lock protruding portion and an extension portion, the second end including a tapered portion, and the actuator is rotatably mounted via the pivot to the extension portion;

a tension member;

a lock mount portion, the lock protruding portion including a guide post to secure the lock frame to the lock mount portion; and a bolt, wherein the tension member is captive between the actuator, the lock frame, and the bolt.

2. The apparatus for opening/closing the knife according to claim 1, wherein the actuator is configured to rotate between the lock protruding portion and the tapered portion or the second end.

3. The apparatus for opening/closing the knife according to claim 1, wherein the pivot is at a portion of the actuator closest to the tension member.

4. The apparatus for opening/closing the knife according to claim 1, wherein the actuator comprises a slot/aperture portion.

5. The apparatus for opening/closing the knife according to claim 4, wherein the first slot/aperture portion is configured to receive the tapered portion.

6. The apparatus for opening/closing the knife according to claim 1, wherein the lock frame comprises a slot/aperture portion.

7. The apparatus for opening/closing the knife according to claim 6, wherein a blade of the knife is configured to rotate through the second slot/aperture portion.

8. The apparatus for opening/closing the knife according to claim 1, wherein the guide post extends through a track/groove portion of the lock mount portion to protrude through a scale/grip/handle of the knife.

9. The apparatus for opening/closing the knife according to claim 1, wherein the guide post is configured to move in a linear direction through a track/groove portion of the lock mount portion.

10. The apparatus for opening/closing the knife according to claim 1, wherein the guide post comprises a first guide post part and a second guide post part.

11. The apparatus for opening/closing the knife according to claim 1, wherein the extension portion extends in a direction orthogonal to a direction in which the lock protruding portion extends.

12. The apparatus for opening/closing the knife according to claim 1, wherein the actuator is configured in a position which is recessed beneath a scale/grip/handle of the knife.

13. The apparatus for opening/closing the knife according to claim 1, wherein the tension member applies a force to a bottom portion of the actuator to maintain the actuator in a position which is recessed beneath a scale/grip/handle of the knife.

14. The apparatus for opening/closing the knife according to claim 1, wherein the lock frame is substantially parallel to a track/groove portion of the lock mount portion.

15. The apparatus for opening/closing the knife according to claim 1, wherein the lock frame is a substantially U-shaped component.

* * * * *